(12) United States Patent
Faus et al.

(10) Patent No.: US 9,207,118 B2
(45) Date of Patent: Dec. 8, 2015

(54) APPARATUS, SYSTEM AND METHOD FOR SCANNING MONOCHROMATOR AND DIODE ARRAY SPECTROMETER INSTRUMENTATION

(75) Inventors: Robert J. Faus, Longmont, CO (US); Leonid G. Feldman, Broomfield, CO (US); Alexander F. H. Goetz, Boulder, CO (US)

(73) Assignee: ASD, Inc.

( * ) Notice: Subject to any disclaimer, the term of this patent is extended or adjusted under 35 U.S.C. 154(b) by 394 days.

(21) Appl. No.: 13/429,096

(22) Filed: Mar. 23, 2012

(65) Prior Publication Data

US 2012/0242991 A1   Sep. 27, 2012

Related U.S. Application Data

(60) Provisional application No. 61/467,870, filed on Mar. 25, 2011.

(51) Int. Cl.
*G01N 21/25* (2006.01)
*G01J 3/28* (2006.01)
*G01J 3/06* (2006.01)

(52) U.S. Cl.
CPC ...... *G01J 3/28* (2013.01); *G01J 3/06* (2013.01)

(58) Field of Classification Search
CPC ................. G01J 3/26; G01J 3/51; G10J 9/00; G01N 21/25; G01N 21/255
USPC ................................................. 356/416–419
See application file for complete search history.

(56) References Cited

U.S. PATENT DOCUMENTS 7,505,641 B1 *  3/2009  Senturia et al. ................. 385/12

* cited by examiner

*Primary Examiner* — Abdullahi Nur
(74) *Attorney, Agent, or Firm* — Cooley LLP

(57) ABSTRACT

A system and method for determining bias in a spectrometer is described. One embodiment includes a method for determining bias in a spectrometer system, the method comprising over-scanning a grating in a near-zero-response wavelength range; and determining a bias based on the over-scanning. This methodology allows for over-scanning a grating in a near-zero-response wavelength range as a substitute for using shutters or other mechanisms to block light from entering a detector in the system.

17 Claims, 5 Drawing Sheets

Step 110

DETERMINING A NEAR-ZERO-RESPONSE RANGE FOR A DETECTOR

Step 120

OVER-SCANNING A GRATING IN THE NEAR-ZERO-RESPONSE RANGE

Step 130

DETERMINING A BIAS BASED ON THE OVER-SCANNING

Step 110

DETERMINING A
NEAR-ZERO-RESPONSE
RANGE FOR A DETECTOR

Step 120

OVER-SCANNING A GRATING IN THE
NEAR-ZERO-RESPONSE RANGE

Step 130

DETERMINING A BIAS BASED ON
THE OVER-SCANNING

FIGURE 1

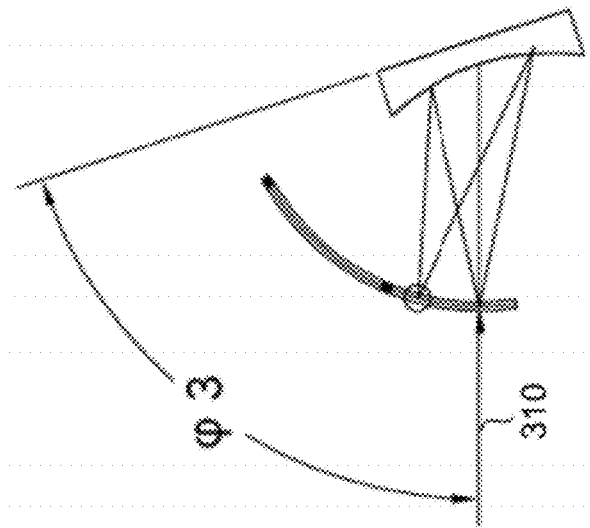
FIG. 3A
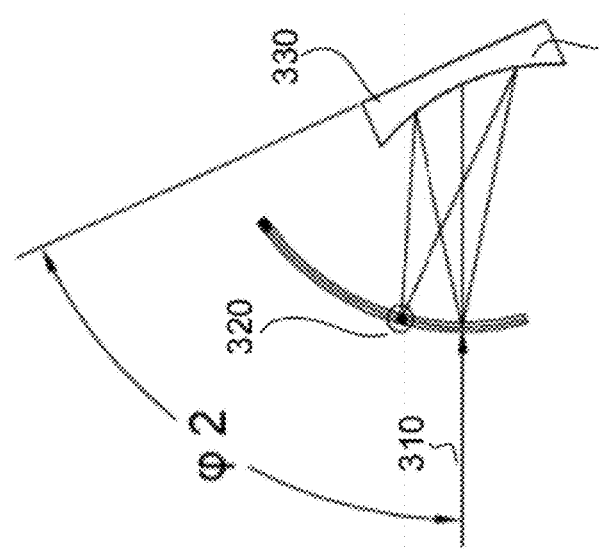
FIG. 3B
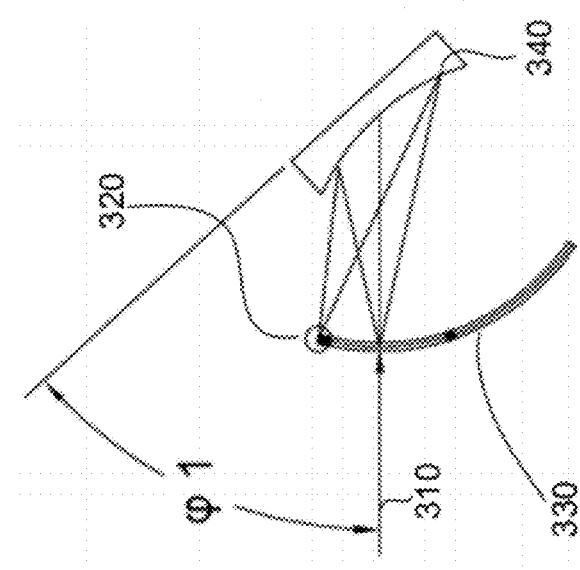
FIG. 3C
FIGURE 3

Step 410

PROVIDING A SPECTROMETER WITH AT LEAST ONE MASKED DETECTOR ELEMENT AND AT LEAST ONE UNMASKED DETECTOR ELEMENT

Step 420

PERFORMING A MEASUREMENT, WHEREIN THE UNMASKED DETECTOR ELEMENT(S) PROVIDE A MEASUREMENT VALUE(S) OF THE SAMPLE AND THE MASKED DETECTOR ELEMENT(S) PROVIDE A DARK-CURRENT VALUE(S)

Step 430

DETERMINING A BIAS ADJUSTMENT(S) FOR THE UNMASKED DETECTOR ELEMENT(S) BASED ON THE DARK CURRENT VALUE(S)

Step 440

ADJUSTING THE MEASUREMENT VALUE(S) BASED ON THE BIAS ADJUSTMENT(S)

FIGURE 4

APPARATUS, SYSTEM AND METHOD FOR SCANNING MONOCHROMATOR AND DIODE ARRAY SPECTROMETER INSTRUMENTATION

PRIORITY

This application claims the benefit of U.S. Provisional Application No. 61/467,870, filed Mar. 25, 2011, entitled Refinements to Scanning Monochromator and Diode Array Spectrometer Instrumentation, which is incorporated herein by reference.

FIELD OF THE INVENTION

The present invention relates to systems and methods for spectroscopic measurements. In particular, but not by way of limitation, the present invention relates to systems and methods for determining bias in a spectrometer.

BACKGROUND OF THE INVENTION

Scanning monochromators have been used for many decades to provide either a monochromatic source of light or to disperse the light emitted or reflected from a surface onto a detector. As such instrumentation has been made smaller to allow for portable use, the optical designs have undergone changes to allow for fewer parts to meet the requirements for compactness and weight reduction.

In a scanning spectrometer, a diffraction grating is rotated through a specified angle to bring the desired wavelengths to the detector. The bias is typically determined by swinging a shutter to cover the entrance slit at the end of each scan or, if the grating is rotated through 360° a blackened holder or light trap absorbs all the light entering the spectrometer so that nothing reaches the detector.

In a diode-array spectrometer, a solenoid-activated shutter at the entrance slit blocks the light from entering the spectrometer. The dark-current bias is different for each detector element in the array and the bias adjustment is stored and subtracted individually for each detector element in the control software. The amount of dark current is a function of the integration time and values are measured after the integration time has been determined based on the lighting situation.

When the spectrometer systems are miniaturized, there is less room to mount a solenoid or position a swinging shutter in a scanning spectrometer. In some cases a shutter cannot be accommodated for mechanical reasons.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for determining bias in a spectroscopic system. In one exemplary embodiment, the present invention can include a method for determining bias in a spectrometer system, the method comprising over-scanning a grating in a near-zero-response wavelength range; and determining a bias based on the over-scanning. The near-zero-response wavelength range may be a wavelength range within which the response of a detector used to perform the over-scanning is equal to, or less than, $10^{-4}$ (or $10^{-5}$) times the peak response of the detector. The near-zero-response wavelength range may be a wavelength range outside a detection range of a detector used to perform the over-scanning, or a wavelength range in a filter-absorbing wavelength region of a filter in the optical path of a detector used to perform the over-scanning. In the latter embodiment, the filter-absorbing wavelength region may be a region wherein 0.02% or less of light (and preferably 0.01% or less of light) is transmitted by the filter. In one embodiment, the over-scanning may occur at the beginning of the detector's nominal wavelength range and the selectively absorbing filter is a long-pass filter designed to absorb at wavelengths at the beginning of the detector's nominal wavelength range.

In another exemplary embodiment, the present invention can include a method for spectroscopic measurements, the method comprising: making a spectroscopic measurement with a spectrometer, wherein the spectroscopic measurement is made within a measurement range for the spectrometer; performing an over-scan in a near-zero-response wavelength range; and determining a bias based on the over-scan. In one embodiment, the near-zero-response wavelength range may be determined based on a wavelength range within which the response of a detector used to perform the over-scan is equal to, or less than, $10^{-4}$ times the peak response of the detector. In another embodiment, the near-zero-response wavelength range may be determined based on a wavelength range outside a detection range of a detector used to perform the over-scan. In another embodiment, the near-zero-response wavelength range may be a wavelength range in a filter-absorbing wavelength region of a filter in the optical path of a detector used to perform the over-scan. In one embodiment, the filter may be more than one filter, wherein the over-scanning occurs at (a) the end of the system's nominal wavelength range and the selectively absorbing filter includes a short-pass filter designed to absorb at wavelengths at the end of the system's nominal wavelength range; and (b) the beginning of the detector's nominal wavelength range and the selectively absorbing filter includes a long-pass filter designed to absorb at wavelengths at the beginning of the detector's nominal wavelength range.

In a further exemplary embodiment, the present invention can include a method for determining bias in a spectrometer system, the method comprising: providing a detector; positioning a grating such that a wavelength selected by the grating is in a near-zero-response wavelength range; and determining a bias by measuring the detector's response at the wavelength. The wavelength selected by the grating may be outside a detection range of the detector, or may be in a in a filter-absorbing wavelength region of a filter in the optical path of a detector used to perform the over-scan. If the wavelength is outside the detection range of the detector, the method may further comprise changing the position of the grating such that the detector measures a bias-sample range, wherein the bias-sample range is in the near-zero-response wavelength range; and determining the bias based on an average of the measurements in the bias-sample range.

In a further exemplary embodiment, the present invention can include a system for spectroscopic measurement, the system comprising: a detector configured to make spectroscopic measurements within a measurement range; a grating configured to select a wavelength provided to the detector; a controller configured to position the grating to provide a sample wavelength to the detector, wherein the sample wavelength is within a near-zero-response wavelength range; and a processor configured to determine a bias correction based on a measurement of the sample wavelength. In certain embodiments, the system may further include a filter, wherein the filter is positioned in an optical path of the detector, and wherein the near-zero-response wavelength range is in a filter-absorbing wavelength region of the filter.

In a further exemplary embodiment, the present invention can include a method for bias correction for a spectrometer, the method comprising: providing a detector with a plurality of detector elements, wherein the plurality of detector elements comprises at least one unmasked detector element and at least one masked detector element, wherein the at least one masked detector element is masked to prevent light from entering; performing a spectroscopic measurement with the spectrometer, wherein the at least one unmasked detector element provides a measurement value and wherein the at least one masked detector element provides a dark-current value; determining a bias adjustment value for the at least one unmasked detector element based on the dark-current value from the at least one masked detector element; and adjusting the measurement value based on the bias adjustment value. In this embodiment, determining the bias adjustment value for the unmasked detector element may comprise: calculating a dark-current value for the unmasked detector element based on the dark-current value from the at least one masked detector element. In one embodiment, calculating the dark-current value for the unmasked detector element may comprise multiplying the dark-current value from the at least one masked detector element by a ratio between a predetermined dark-current value for the at least one unmasked detector element and a predetermined dark-current value for the at least one masked detector element. These predetermined dark-current values for the at least one unmasked detector element and the at least one masked detector element may be for a temperature substantially the same as the temperature when spectroscopic measurement was performed in order to improve the accuracy of the bias determination. In another embodiment, determining the bias adjustment value for the at least one unmasked detector element comprises: correlating the dark-current value from the at least one masked detector element with a previously determined corresponding dark-current value for the at least one unmasked detector element.

In yet a further exemplary embodiment, the present invention can include a system for spectroscopic measurements, the system comprising: a plurality of detector elements, wherein the plurality of detector elements comprises at least one unmasked detector element and at least one masked detector element, wherein the at least one masked detector element is masked to prevent light from entering; a processor configured to measure a sample value from the at least one unmasked detector element and to measure a dark-current value from the at least one masked detector element; and a bias determination module to determine a bias adjustment value for the at least one unmasked detector element based on the dark-current value from the at least one masked detector element. This system may further includes a memory, wherein the memory stores a predetermined dark-current value for the at least one unmasked detector element and a predetermined dark-current value for the at least one masked detector element. In certain embodiment, the predetermined dark-current values for the at least one unmasked detector element and the at least one masked detector element may be for a range of temperatures.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 1 illustrates a flow chart of a method of determining bias in a spectroscopic system consistent with an embodiment of the present invention;

FIGS. 3A-3C illustrates the positioning of a detector and grating that are being used for over-scanning bias determination in accordance with an embodiment of the present invention;

FIG. 4 illustrates a flow chart of a method of determining bias consistent with one embodiment of the present invention that may be employed with a spectrometer that includes more than one detector;

DETAILED DESCRIPTION

Figure 2:
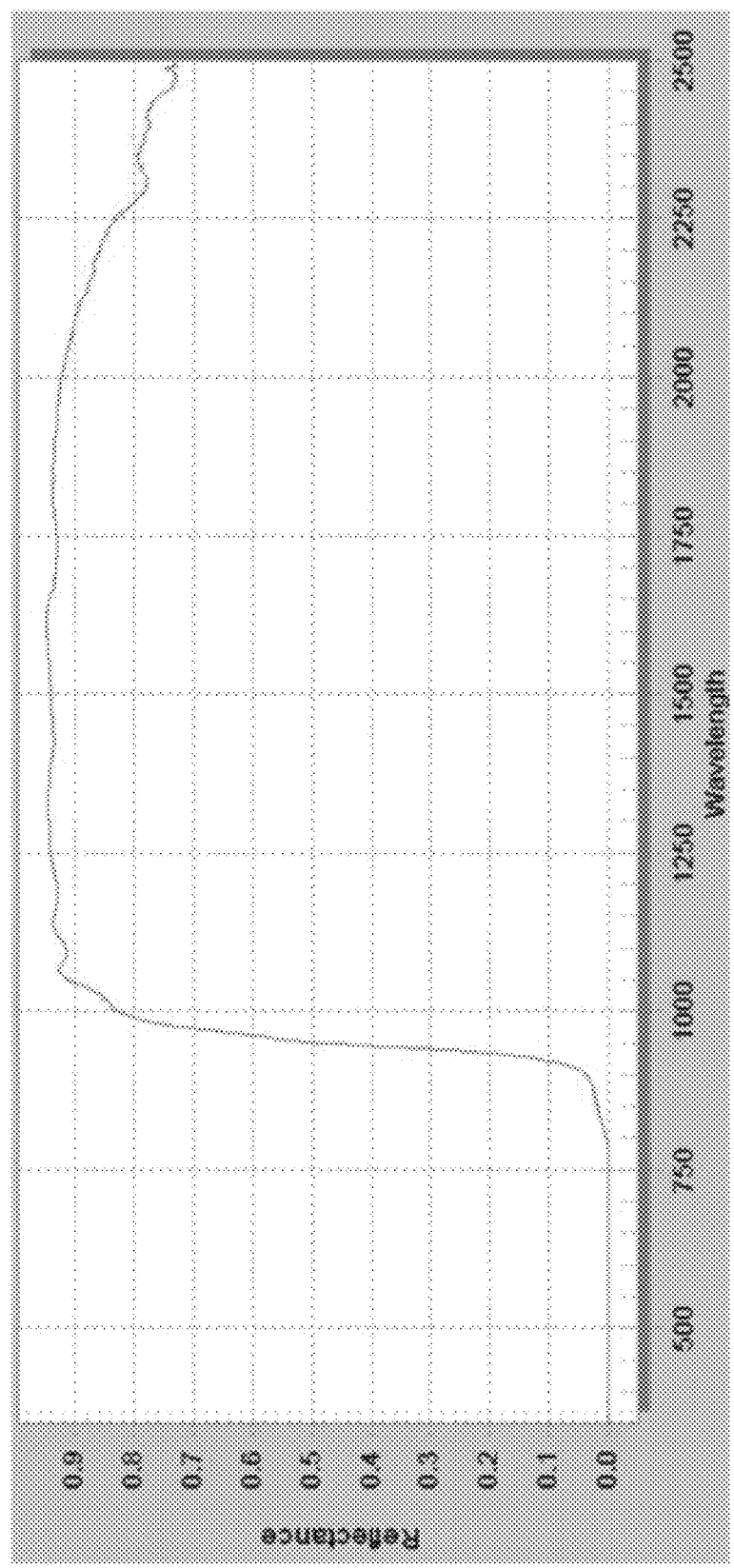
FIG. 2 illustrates a bandpass of a typical order separation filter for a spectrometer operating in the 1000-1800 nm region, wherein the filter is opaque to radiation short of approximately 750 nm allowing this region to substitute for a shutter in front of the entrance aperture

Referring now to the drawings, where like or similar elements are designated with identical reference numerals throughout the several views, and referring in particular to FIG. 1, it illustrates a flow chart consistent with an embodiment of the present invention. As shown, Step 110 includes determining a near-zero-response range for a detector. As will be discussed in the embodiments below, a near-zero-response range for a detector is a wavelength range within which the response of the detector when uncovered simulates the response of the detector when it is covered (light is blocked for entering the detector). Once the near-zero-response range is known, the system can begin (Step 120) over-scanning a grating in the near-zero-response range. The term over-scanning is used to represent the fact that the detector is being used to scan in a wavelength region that falls outside the spectrometer's intended measurement range. In Step 130, the results of this over-scanning may be used to determine a bias for the detector.

Determining the near-zero-response range (Step 110) may be understood as determining a wavelength range within which the response of a detector is equal to, or less than, $10^{-4}$—and preferentially $10^{-5}$—multiplied by the peak response of the detector. As discussed herein, the wavelength range(s) that comprise the near-zero-response range may be based on multiple factors, including detector material and/or the presence of any filters. In one embodiment, a near-zeroresponse range for a detector may depend on the detector material. Wavelengths that fall outside the detection range for a given detector material—on the low side and/or on the high side—would be included within the near-zero-response range. For example, if a detector is comprised of a detector material that is only capable of detecting light within a range from 800 nm to 2400 nm, the near-zero-response range would include wavelengths below 700 nm and above 2500 nm. In this example, the near-zero-response range is set to allow a buffer of 100 nm below the low range, and above the high range, of the detector material. This buffer may be increased, reduced, or eliminated depending on the detector.

In another embodiment, a near-zero-response range may be determined based on a filter (or filters) used with the detector. In a scanning spectrometer operating in the first-order diffraction region, an order separation filter is inserted in the optical path in order to keep higher order light from reaching the detector. For instance, if a spectrometer is operating in the 1000-1800 nm region in the first order, without an order separation filter, second order light at 500 nm wavelength would reach the detector at 1000 nm; 700 nm light at 1400 nm and 900 nm as well as 450 nm light at 1800 nm. A filter may be used to keep second order light from reaching the detector.

For purposes of explanation, FIG. 2 illustrates a bandpass of a typical order separation filter for a spectrometer operating in the 1000-1800 nm region. At 900 nm less than 3% of the light is transmitted and by 700 nm essentially no light (less than 0.01%) is transmitted. This filter-absorbing wavelength region, which may be a wavelength range wherein less than 0.05%, 0.02%, 0.01%, or 0.001% of light is transmitted, is an example of a near-zero-response range that may be over-scanned for purposes of bias determination. Thus, one embodiment of the present invention concerns over-scanning the spectrometer grating to reach the filter-absorbing wavelength region. It is possible for white light to enter the slit and be scattered within the spectrometer and reach the detector without encountering the grating. This problem is conventionally handled by inserting baffles to absorb errant photons. Over-scanning to wavelengths in the filter-absorbing wavelength region provides the same bias information as a conventional swinging shutter without the concomitant mechanical shutter parts and room to swing.

Referring back to FIG. 1, over-scanning a grating in the near-zero-response range (Step 120) includes various embodiments. In one embodiment, the near-zero-response range may be defined by the detection material. For example, the detector material only detects light between 1000-1800 nm. In this example, over-scanning the grating may comprise beginning scanning at 600 nm and scanning through 2200 nm. This would result in over-scanning on both sides of the measurement range. The detector response on either side, or both sides, may then be used to determine a bias. In another example, a long pass filter may be used to absorb wavelengths at the beginning of the detector's nominal wavelength range. For example, a detector may be capable of scanning between 500-1500 nm but a long-pass filter is used to absorb light below 900 nm. In this embodiment, the over-scanning may involve scanning between 500-1500 nm, wherein the over-scanning is the portion of the scanning in the filter-absorbing wavelength region of the long-pass filter. As disclosed in these embodiments, it is preferred, but not required, that the over-scan be performed in the same scan during which the spectroscopic measurements of the sample/light source are acquired. In some embodiments, the process may involve separately performing a scan in the measurement range, and then over-scanning in the near-zero-response range to determine bias.

Another embodiment of the present invention includes a system for spectroscopic measurement and bias adjustment. In one embodiment, the system includes a detector, a grating, a controller configured to control the grating position, and a processor configured to determine bias correction. Consistent with the description herein, the detector may be any type of spectroscopic detector configured to make spectroscopic measurements within a measurement range. In order to obtain both sample measurements and over-scanning measurements, a controller is configured to position the grating to select a wavelength provided to the detector. The controller may be a hardware and/or software configured to control the operation of the grating. The measurements themselves may be analyzed by a processor to determine the bias correction. The processor may be hardware, software, or some combination thereof, used to analyzing the measurement values. In one embodiment, the controller and the processor may each be software modules that run on a computer configured to control and monitor the spectrometer system. A filter, positioned in the optical path of the detector, may be further included consistent with the description herein.

FIG. 3 includes an embodiment of a detector and grating that are being used for over-scanning bias determination in accordance with an embodiment of the present invention. FIGS. 3A-3C show a diagram of the scanning sequence. As shown, FIG. 3A shows the position of the grating at the long-wavelength portion of the spectrum with the light source being dispersed by the grating into the detector. In FIG. 3B, the system is in the position of the shortest wavelength at which the desired spectrum is acquired. And in FIG. 3C it shows the system in the shortest wavelength position being scanned and falls at a wavelength at which an order separation filter is opaque. In one embodiment, the system could start in position shown in FIG. 3A and sweep through all the angles between $\phi 1$ and $\phi 3$ shown in FIG. 3C. In another embodiment, the system could start in the position shown in FIG. 3C and sweep through until it reaches the position in FIG. 3A. This allows the system to scan the desired wavelength range ($\phi 2$ to $\phi 3$ or $\phi 3$ to $\phi 3$) while also determining the bias from at least the measurement that can be performed in the position shown in FIG. 3C. It is also noted that this embodiment could be reversed so that the longest wavelength being scanned falls at a wavelength at which an order separation filter is opaque. The diagram could be reversed and the scan begun beyond the long-wavelength cutoff where the detector has no response and end at the shortest desired wavelength at position FIG. 3B.

In the case of a diode array spectrometer another approach is necessary. FIG. 4 illustrates an embodiment of the present invention that may be employed with a spectrometer that includes a detector with more than one detector element. In Step 410, a spectrometer is provided with at least one masked detector element and at least one unmasked detector element. Any combination of the number of masked and unmasked detector elements is possible, and those of skill in the art may select a desired ratio between masked and unmasked detector elements depending on the system at issue. The masked detector elements are masked in order to prevent light from reaching those detector elements.

In Step 420, the spectrometer may be used to take a measurement. During the measurement process, the unmasked detector element(s) will record a measurement value associated with the sample or light source being measured. It should be understood that if multiple unmasked detector elements are used, multiple measurements will be received. These measurements may be stored separately, averaged and stored as a single value, etc. During the measurement, the masked detector(s) will provide a dark-current value(s). Again, it should be understood that if multiple masked detector elements are used, multiple dark-current values will be provided. These dark-current values may be stored separately, averaged and stored as a single value, stored in relation to specific measurement values from particular unmasked detector elements, etc.

Once the measurement value(s) and dark-current value(s) have been received, a bias adjustment for the unmasked detector element(s) may be determined based on the dark-current value(s) (Step 430). There are numerous ways in which the bias adjustment may be determined. For example, each masked detector element may be associated with a particular unmasked detector element, such that the dark-current value from a given masked detector element is used to adjust the measurement value from its corresponding unmasked detector element. Alternatively, an average value of the dark-current values from all the masked detector elements may be used to adjust the individual measurement values from each of the unmasked detector elements. As will be understood by those of skill in the art, numerous possible combinations are possible.

The bias adjustment itself may be directly or indirectly determined from the dark-current values. For example, in one embodiment, the bias adjustment value may be the dark-current value from the one or more masked detector elements. In other embodiments, an adjustment may be made to the measured dark-current values based on a predetermined relationship between the measured dark-current values and the proper bias adjustment for a given unmasked detector element. For example, in one embodiment, the dark-current value from the at least one masked detector element may be correlated with a previously determined corresponding dark-current value for the at least one unmasked detector element. In another embodiment, the dark-current value from the at least one masked detector element may be multiplied by a ratio between a predetermined dark-current value for the at least one unmasked detector element and a predetermined dark-current value for the at least one masked detector element.

By covering the entrance slit of the spectrometer, or the optical fiber bundle directing the light to the entrance slit, once for each integration time and mapping the dark current response of each individual detector element, a dark current value can be stored and subtracted from each detector element during spectrum analysis. Dark current changes with temperature are tracked by the masked detector elements and a correction factor can be applied to the whole array with each spectrum collect. This technique can be further enhanced by measuring the temperature of the array and creating a one-time, dark current map of each of the individual array detector elements as a function of temperature in order to provide increased correction accuracy. This technique takes into account the fact that each of the detector elements, although highly correlated with the response of the masked detector elements, has a slightly different dark current response with temperature than the masked detector elements.

Figure 5:
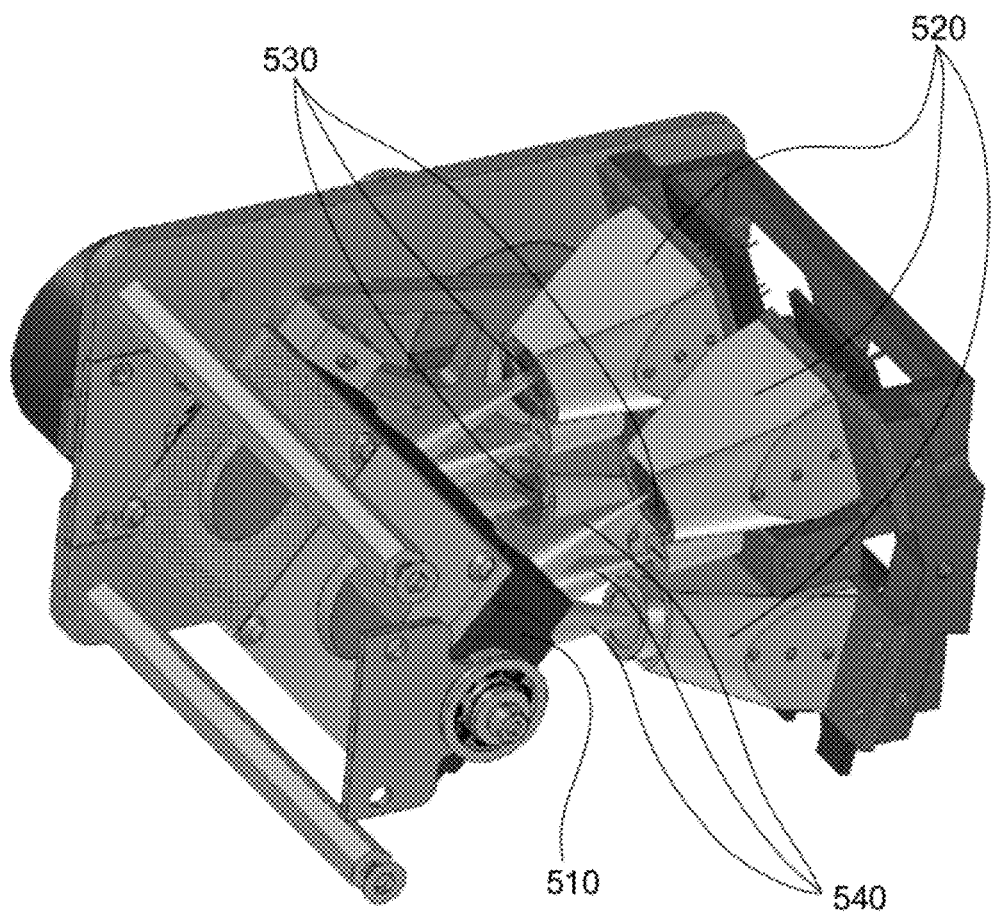
FIG. 5 includes an optical diagram of a spectrometer system showing the entrance slit and a cone of light falling on the grating which is behind the mounting fixture, being diffracted into a cone of light that falls on, in sequence, the order separation filter, the exit slit and the detector, all mounted in the truncated pyramid housings.

An exemplary design of one embodiment of the present invention is shown in FIG. 5. In this exemplary design, the size is 5.4×4.2×2.7 inches. The 5.4 inch dimension could be reduced by one inch if a pancake motor was used to replace the cylindrical brushless motor used in the embodiment in FIG. 5.

As shown in this embodiment, the mechanical layout shows the grating holder 510, detector optics assemblies 520 capped with order separation filters 530 and the optical ray cones 540 emanating from the fiber optical bundle at the center and returning to the detector entrance slits on either side. The drive motor and the optical shaft encoder are mostly hidden. In accordance with this embodiment, no mechanical shutter is being used; an over-scan is used so that dark current can be collected in the shortwave end of the spectrum where the individual order separation filters are opaque. If the distance between the exit slit and detector lens is allowed to vary from the existing value, the geometric throughput of the baseline detector lens concept is substantially improved.

The embodiment in FIG. 5 is not intended to limit the present invention. Instead, it merely provides one example of how the present invention can provide improvements to spectroscopic systems.

In conclusion, the present invention provides, among other things, a system and method for determining bias in a spectrometer. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for determining bias in a spectrometer system, the method comprising:
    over-scanning a grating in a near-zero-response wavelength range, wherein the near-zero-response wavelength range is a wavelength range in a filter-absorbing wavelength region of a filter in the optical path of a detector used to perform the over-scanning; and
    determining a bias based on the over-scanning.

2. The method of claim 1, wherein the near-zero-response wavelength range is a wavelength range within which the response of a detector used to perform the over-scanning is equal to, or less than, $10^{-5}$ times the peak response of the detector.

3. The method of claim 1, wherein the near-zero-response wavelength range is a wavelength range outside a detection range of a detector used to perform the over-scanning.

4. The method of claim 1, wherein the filter-absorbing wavelength region is a region wherein 0.02% or less of light is transmitted by the filter.

5. The method of claim 1, wherein the filter-absorbing wavelength region is a region wherein 0.01% or less of light is transmitted by the filter.

6. The method of claim 1, wherein the over-scanning occurs at the beginning of the detector's nominal wavelength range and the selectively absorbing filter includes a long-pass filter designed to absorb at wavelengths at the beginning of the detector's nominal wavelength range.

7. The method of claim 1, wherein the over-scanning occurs at the end of the system's nominal wavelength range and the selectively absorbing filter includes a short-pass filter designed to absorb at wavelengths at the end of the system's nominal wavelength range.

8. A method for spectroscopic measurements, the method comprising:
    making a spectroscopic measurement with a spectrometer, wherein the spectroscopic measurement is made within a measurement range for the spectrometer;

performing an over-scan in a near-zero-response wavelength range, wherein the near-zero-response wavelength range is a wavelength range in a filter-absorbing wavelength region of a filter in the optical path of a detector used to perform the over-scan; and determining a bias based on the over-scan.

9. The method of claim 8, wherein the near-zero-response wavelength range is a wavelength range within which the response of a detector used to perform the over-scan is equal to, or less than, $10^{-4}$ times the peak response of the detector.

10. The method of claim 8, wherein the near-zero-response wavelength range is a wavelength range outside a detection range of a detector used to perform the over-scan.

11. The method of claim 8, wherein the filter-absorbing wavelength region is a region wherein 0.02% or less of light is transmitted by the filter.

12. The method of claim 8, wherein the over-scanning occurs at the beginning of the detector's nominal wavelength range and the selectively absorbing filter includes a long-pass filter designed to absorb at wavelengths at the beginning of the detector's nominal wavelength range.

13. The method of claim 8, wherein the over-scanning occurs at (a) the end of the system's nominal wavelength range and the selectively absorbing filter includes a short-pass filter designed to absorb at wavelengths at the end of the system's nominal wavelength range; and (b) the beginning of the detector's nominal wavelength range and the selectively absorbing filter includes a long-pass filter designed to absorb at wavelengths at the beginning of the detector's nominal wavelength range.

14. A method for determining bias in a spectrometer system, the method comprising:

providing a detector;

positioning a grating such that a wavelength selected by the grating is in a near-zero-response wavelength range, wherein the near-zero-response wavelength range is a wavelength range in a filter-absorbing wavelength region of a filter in the optical path of a detector used to perform the over-scan; and determining a bias by measuring the detector's response at the wavelength.

15. The method of claim 14, wherein the wavelength is outside a detection range of the detector.

16. The method of claim 14, further comprising:

changing the position of the grating such that the detector measures a bias-sample range, wherein the bias-sample range is in the near-zero-response wavelength range; and determining the bias based on an average of the measurements in the bias-sample range.

17. The method of claim 14, wherein the filter-absorbing wavelength region is a region wherein 0.02% or less of light is transmitted by the filter.

* * * * *